Patented July 13, 1926.

1,591,984

UNITED STATES PATENT OFFICE.

ERICH KRAUSE AND KOLOMAN ROKA, OF CONSTANCE, GERMANY, ASSIGNORS TO HOLZVERKOHLUNGS-INDUSTRIE AKTIEN-GESELLSCHAFT, OF CONSTANCE, BADENIA, GERMANY, A CORPORATION OF GERMANY.

PROCESS FOR THE CHLORINATION OF HYDROCARBONS.

No Drawing. Application filed June 4, 1924, Serial No. 717,890, and in Germany November 15, 1923.

The invention relates to the chlorination of hydrocarbons such as for instance methane and its homologues, acetylene, benzene, and so on, by the action of chlorine at high temperatures in the presence or in the absence of catalysts.

It has been possible according to the invention to convert the chlorine to an exceptionally complete extent into chlorination products, this effect being obtained by adding oxygen or gas mixtures containing oxygen, for instance air, to the mixture of hydrocarbon and chlorine.

The quantity of oxygen to be used depends on the products aimed at and the method or working. The supply of oxygen may for instance be in theoretical quantities, that is to say, in quantities which are required for the oxidation of the hydrogen split off from the hydrocarbon, water being formed at the same time. In the conversion of methane into mono-chloro-methane for instance the amount of oxygen to be added will be calculated according to the following reaction equation:

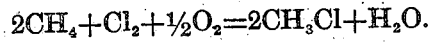

$$2CH_4 + Cl_2 + \tfrac{1}{2}O_2 = 2CH_3Cl + H_2O.$$

For carrying out the process in practice, it has in general been found of advantage to add a definite excess of oxygen over and above the theoretical quantity. By observing suitable reaction conditions, such as for instance the avoidance of overheating and the correct regulation of the velocity of flow of the gases the work can be carried out with considerable excesses of oxygen, for example up to 100% and more, without detrimental effects, such as for example an undesired oxidation of considerable quantities of the hydrocarbon, for instance with the formation of carbon dioxide. The process may be carried out in the absence of catalysts, preferably however with catalysts having the capacity to assist the desired chlorination of the hydrocarbon, but not an undesired oxidation of the same. The presence of catalysts makes it for instance possible to carry out the process at low reaction temperatures.

As catalysts use may be made for instance of metal haloids, such as cupric chloride, iron chloride, thallic chloride, also the chlorides of the alkaline earths and of the rare earths, carbon (animal carbon, active carbon) and other chlorine carriers.

The most suitable working temperatures are from about 300° C. to about 650° C., more particularly from about 400° C. to about 550° C. Excessive heating which might cause undesired oxidation of the hydrocarbon to be chlorinated should be avoided.

The chlorination of hydrocarbons by the action of chlorine under conditions, in which the hydrogen split off from the hydrocarbon is oxidized to water, has the particular advantage that hereby water vapour is produced, which represents a valuable diluent, which is able to prevent explosions or other undesired subsidiary reactions. In spite of this positive formation of water vapour, additional quantities of diluents, such as for example superheated steam, hydrochloric acid, and the like may be added, but this is not necessary if the present process is carried out correctly, as it is possible to produce water vapour in quantities which are capable of preventing explosions and the like with certainty by means of the added oxygen, for instance by the introduction of air. The invention offers the further advantage that by oxidation of the hydrogen split off from the hydrocarbon, the heat thereby produced may be utilized directly for carrying out the chlorination process.

The invention will be illustrated in more detail by a few examples, which show the alternative working conditions which can be employed with respect to the proportions, catalysts, temperatures, velocity of flow, diluents and so on.

*Example 1.*—Into a tube of 30 mm. internal diameter 600 mm. heatable length, which contains chamotte soaked with cupric chloride, there are introduced in the course of an hour 25 litres of methane, 6 litres of chlorine and 31 litres of air. The temperature is kept at 450° C.–500° C. 93% of the chlorine used is converted into chlorination products.

*Example 2.*—Into the same tube there are introduced in the course of an hour 13 litres of methane, 6 litres of chlorine and 22 litres of air and the temperature is kept at 450° C.–500° C. 89% of the chlorine used is converted into chlorination products of the methane.

*Example 3.*—Into a tube of 30 mm. internal diameter, which is charged to a length of 60 cm. with chamotte grains and in the remaining part with grains soaked in cupric chloride, there is introduced in the course of an hour a mixture of 25 litres methane and 6 litres chlorine in such a manner that the gas mixture has first to pass through the part of the tube charged with non-prepared chamotte grains. At the point of contact of the non-impregnated and impregnated chamotte grains air is introduced, that is to say 28 litres thereof per hour. The first part of the tube is kept at a temperature of for example 360° C., the second part at about 450° C.–500° C. 95% of the introduced chlorine is obtained in the form of chlorination products of the methane.

*Example 4.*—Into the tube described in Example 3, there are introduced in the course of an hour 12 litres of methane, 6 litres of chlorine and about 25 litres of steam, at a temperature somewhat below 400° C. in the first half of the tube. In the second half of the tube after the supply of 25 litres of air, the temperature is kept between 450° C. and 500° C. 88% of the introduced chlorine is converted into chlorination products.

Many hydrocarbons, for example natural gases, contain oxygen, the presence of which is to be attributed to the gas being rendered impure by air. It has however not been known that such natural gases containing oxygen were chlorinated by the action of chlorine at higher temperatures. On the other hand it is known that the gases to be chlorinated are often subjected to a preliminary purification, for instance by passing over glowing palladium, platinum, or the like (cf. Austrian Patent 58,273). In a preliminary treatment of this kind, any oxygen that was present would naturally be removed at the same time.

As it was to be feared that with the presence of considerable quantities of oxygen, undesired secondary reactions, such as for instance oxidation of the hydrocarbon, deposition of carbon black, and in some cases even explosions would take place, it can be understood that hitherto a chlorination in the presence of considerable quantities of oxygen has been abstained from. The knowledge that it is possible easily to carry out the chlorination process in the presence of considerable quantities of oxygen, at the same time obtaining important advantages, is a surprising result of technical importance.

What I claim is:—

1. Process for the chlorination of saturated hydrocarbons consisting in causing the said hydrocarbons to react with chlorine at temperatures of 300° to 650° C. in the presence of oxygen, the quantity of oxygen employed and the velocity of the gases being such that undesirable oxidation of the hydrocarbon is avoided.

2. Process for the chlorination of saturated hydrocarbons consisting in causing the said hydrocarbons to react with chlorine at temperatures of 300° to 650° C. in the presence of sufficient oxygen to convert the hydrogen split off from the hydrocarbon into water, the quantity of oxygen employed and the velocity of the gases being such that undesirable oxidation of the hydrocarbon is avoided.

3. Process for the chlorination of saturated hydrocarbons consisting in causing the said hydrocarbons to react with chlorine at temperatures of 300° C. to 650° C. in the presence of oxygen and with the addition of diluting means, the quantity of oxygen employed and the velocity of the gases being such that undesirable oxidation of the hydrocarbon is avoided.

4. Process as claimed in claim 3 in which the diluting means employed is superheated steam.

5. Process for the chlorination of saturated hydrocarbons consisting in causing the said hydrocarbons to react with chlorine at temperatures of 300° to 650° C. in the presence of oxygen, and in the presence of a catalyst capable of aiding chlorination, the quantity of oxygen employed and the velocity of the gases being such that undesirable oxidation of the hydrocarbon is avoided.

6. Process as claimed in claim 5 in which the reaction is effected in the presence of a metallic chloride as catalyst.

7. Process as claimed in claim 5 in which the reaction is effected in the presence of copper chloride as catalyst.

8. Process for the chlorination of methane consisting in causing the said gas to react with chlorine at temperatures of 300° to 650° C. in the presence of oxygen, the quantity of oxygen employed and the velocity of the gases being such that undesirable oxidation of the hydrocarbon is avoided.

9. Process for the chlorination of methane consisting in causing the said gas to react with chlorine at temperatures of 300° to 650° C. in the presence of air and in the presence of a catalyst capable of aiding chlorination, the quantity of air employed and the velocity of the gases being such that undesirable oxidation of the methane is avoided.

10. Process for the chlorination of saturated hydrocarbons consisting in causing the said hydrocarbons to react with chlorine at temperatures of 300° to 650° C. in the presence of oxygen, in the presence of a catalyst capable of aiding chlorination and also in the presence of diluting means, the quantity of oxygen employed and the velocity of the gases being such that undesirable oxidation of the hydrocarbon is avoided.

11. Process for the chlorination of saturated hydrocarbons consisting in causing the said hydrocarbons to react with chlorine at temperatures of 300° to 650° C. in the presence of oxygen and diluting means, the quantity of oxygen employed and the velocity of the gases being such that undesirable oxidation of the hydrocarbon is avoided.

12. Process as claimed in claim 8 in which the reaction is effected in the presence of diluting means.

In testimony whereof we affix our signatures.

ERICH KRAUSE.
KOLOMAN ROKA.